Aug. 19, 1924.

O. HARTY

RAT TRAP

Filed Oct. 11, 1923

2 Sheets-Sheet 1

Inventor
O. Harty

By H. K. Bryant
Attorney

Aug. 19, 1924.

O. HARTY

RAT TRAP

Filed Oct. 11, 1923

1,505,783

2 Sheets-Sheet 2

Inventor
O. Harty
By J. K. Bryant
Attorney

Patented Aug. 19, 1924.

1,505,783

UNITED STATES PATENT OFFICE.

OWEN HARTY, OF DANTE, SOUTH DAKOTA.

RAT TRAP.

Application filed October 11, 1923. Serial No. 667,993.

*To all whom it may concern:*

Be it known that I, OWEN HARTY, a citizen of the United States of America, residing at Dante, in the county of Charles Mix and State of South Dakota, have invented certain new and useful Improvements in Rat Traps, of which the following is a specification.

This invention relates to certain new and useful improvements in rat traps and particularly to the type embodying a water receptacle for drowning the trapped rats.

The primary object of the invention is to provide a rat trap having a trap door that is operated by the weight of a rodent thereon and is adapted to be released by trigger mechanism including a bait support for directing the rodent into a water receptacle for drowning.

With the above and other objects in view as the nature of the invention is better understood, the same consists of the novel form, combination and arrangement of parts hereinafter more fully described, shown in the accompanying drawings and claimed.

Figure 1:
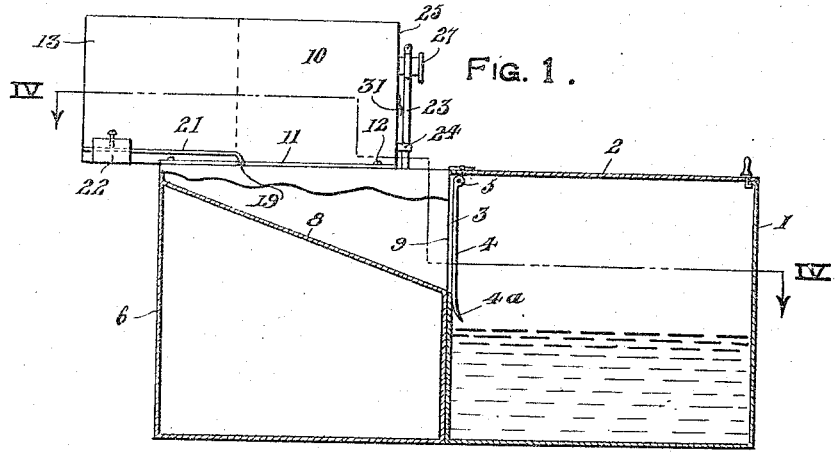
Figure 2:
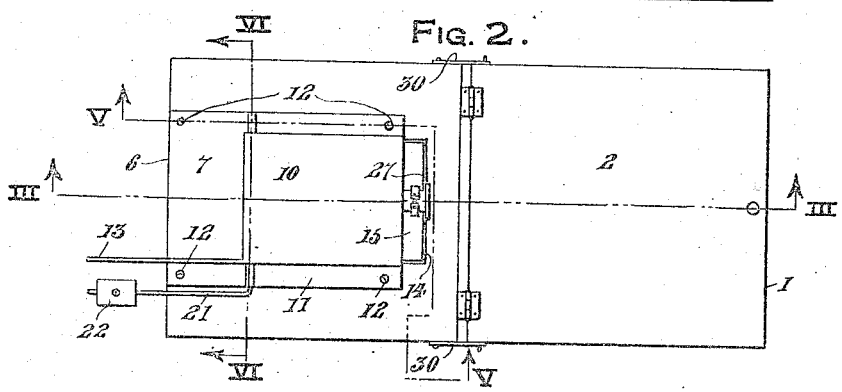
Figure 3:
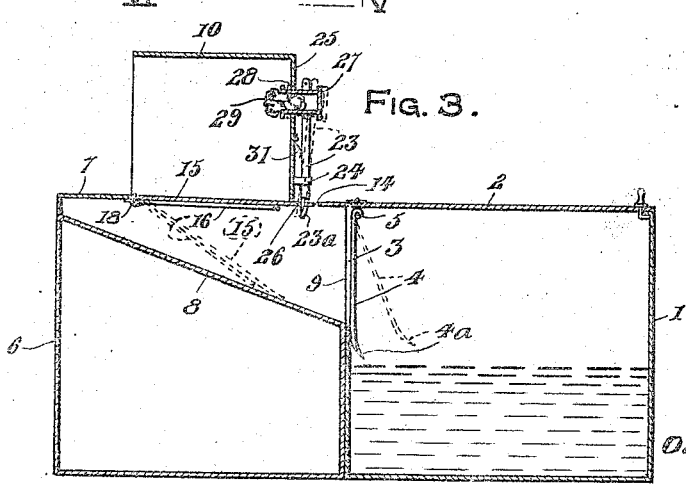
Figure 4:
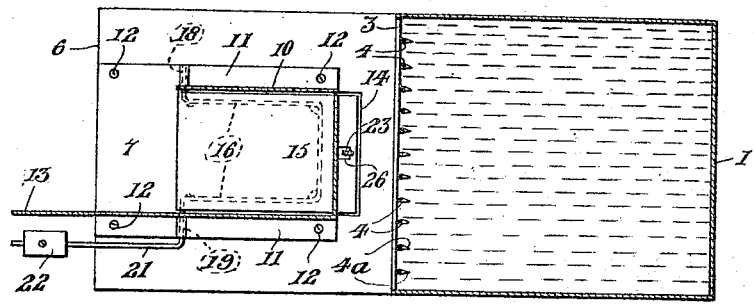
Figure 5:
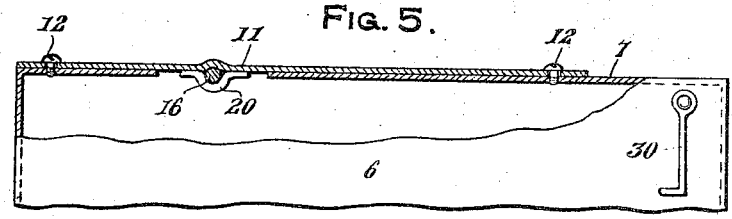
Figure 6:
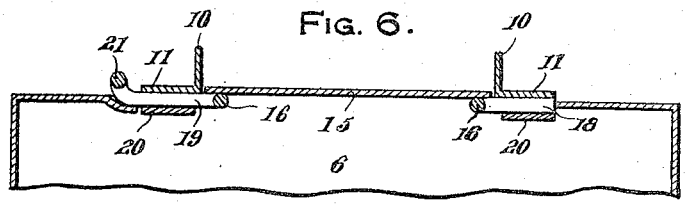
Figure 7:
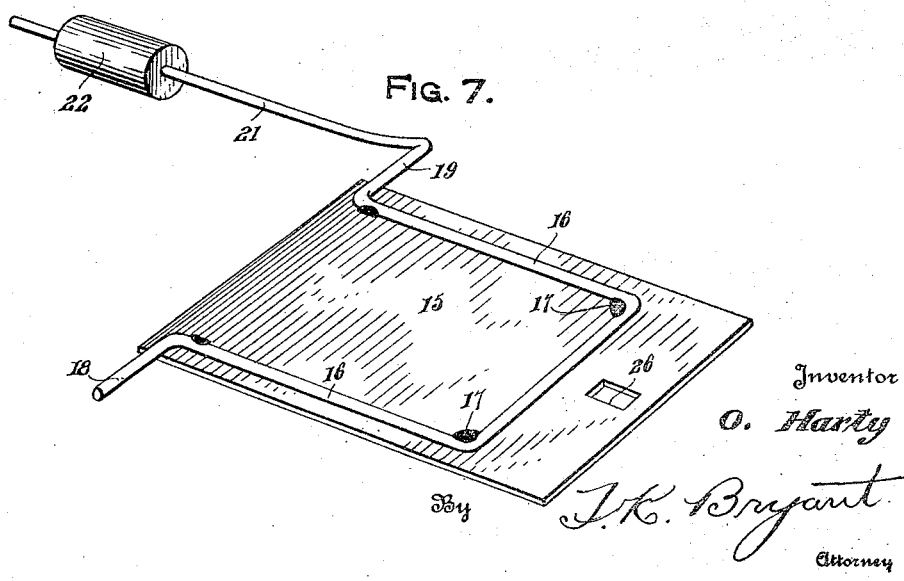

In the drawings, wherein like reference characters designate corresponding parts throughout the several views, Figure 1 is a side elevational view, partly in section of a rat trap constructed in accordance with the present invention, Figure 2 is a top plan view of the device, Figure 3 is a longitudinal sectional view taken on line III—III of Fig. 2 showing the trap door and bait carrying latch by dotted lines in their released positions, Figure 4 is a horizontal longitudinal sectional view taken on line IV—IV of Fig. 1, Figure 5 is a detail sectional view taken on line V—V of Fig. 2 showing the connection between the entrance hood and the casing supporting the same, Figure 6 is a cross-sectional view taken on line VI—VI of Fig. 2 showing the hinged mounting for the trap door, and Figure 7 is a perspective view of the trap door and weighted arm associated therewith.

Referring more in detail to the accompanying drawings, there is illustrated a rat trap embodying a fluid receptacle 1 provided with a hinged cover 2 permitting access thereto for emptying the same and further for cleaning purposes, the inner end wall of the receptacle 1 having a relatively large opening 3 at the upper side thereof through which the rodents enter. A plurality of guard fingers 4 are hingedly mounted at their upper ends at 5 adjacent the upper end of the opening 3 with the lower ends 4ª thereof projecting below the lower end of said opening and engaging the inner face of the inner end wall of the receptacle 1 being permitted to swing freely inwardly as illustrated by dotted lines in Fig. 3 for permitting free entrance to the receptacle 1 and preventing escape therefrom.

The receptacle 1 is associated with another receptacle 6 that has a rigid upper wall 7 and an inclined false bottom 8 while the inner end of the receptacle 6 is open at its upper end as at 9 above the false bottom 8 and is in communication with the opening 3 in the inner end wall of the receptacle 1.

An entrance hood 10 is supported on the upper wall 7 of the receptacle 6, the entrance hood 10 carrying base flanges 11 that are anchored as at 12 to the upper wall 7 as shown in detail in Fig. 5, one side wall of the entrance hood 10 carrying an outwardly directed guard plate 13 extending beyond the outer end of the receptacle 6 The upper wall 7 of the receptacle 6 beneath the entrance hood 10 is provided with an opening 14 that is normally closed by a trap door 15, the latter being illustrated in detail in Fig. 7 and carried by a frame bar 16 that is secured as at 17 to the lower face thereof, the ends of the frame bars 16 being angularly bent as at 18 and 19 to provide hinge bodies for the trap door 15 in being supported as at 20 upon opposite walls of the opening 14 adjacent the outer end thereof. To maintain the trap door 15 in its normally closed position, an arm 21 extends at an angle to the bent end 19 of the wire frame and carries an adjustable weight 22 for controlling operation thereof.

The trap door 15 is normally retained in a closed and locked position by the weight 22 and latch arm 23 that is pivotally mounted adjacent its lower end as at 24 in strap bearings carried by the forward wall 25 of the entrance hood 10, the lower end 23ª of the latch arm 23 being in the form of a foot that engages an edge wall of the opening 26 in the free swinging end of the trap door 15. The upper end of the latch arm 23 carries a sleeve member 27 slidable through an opening 28 in the forward wall 25 of the hood and adapted to support bait 29 in the inner end thereof within the hood 10.

With the receptacles 1 and 6 assembled as illustrated, the same are so retained by the latch hooks 30 carried by the receptacle 6 and engaging the receptacle 1, and the trap door 15 is retained in a closed position by the latch hook 23$^a$ engaging an edge of the opening 26 in the trap door. The weight 22 is hidden from view by the extension guard wall 13, and a rodent entering the hood 10 attacks the bait 29 and moves the sleeve 27 outwardly of the hood as shown by dotted lines in Fig. 3, releasing the latch hook 23$^a$ from the trap door 15 while the weight of the rodent overbalances the trap door and is delivered upon the inclined false bottom 8 in the receptacle to a position for entering the receptacle 1 in attempting to escape through the registering openings 9 and 3 by shifting the loosely swung fingers 4 to the dotted line position shown in Fig. 3. The rodent is then confined within the receptacle 1 and is drowned in water placed therein, escape therefrom being prevented as the guard fingers 4 overlie the registering openings between the two receptacles. The weight 22 returns the trap door 15 to its normal position and the same is automatically locked in a closed position by engaging the latch hook 23$^a$.

While there is herein shown and described the preferred embodiment of the present invention, it is nevertheless to be understood that minor changes may be made therein without departing from the spirit and scope of the invention as claimed.

What is claimed as new is:—

In a trap of the class described, a pair of communicating casings, one containing water and having a non-return entrance thereto, an entrance hood on the other casing, a trap door interposed between the hood and casing supporting the same, a latch rod pivoted to the entrance hood and engaging the trap door for holding the same in a locked elevated position, said latch rod being mounted exteriorly of the hood, and a tubular member carried by the upper end of the rod and slidably extending into the hood for supporting bait within the hood.

In testimony whereof I affix my signature.

OWEN HARTY.